(12) United States Patent
Saida

(10) Patent No.: US 6,404,171 B2
(45) Date of Patent: Jun. 11, 2002

(54) ALTERNATING-CURRENT ELECTRIC POWER CONTROLLING APPARATUS AND METHOD FOR CONTROLLING SUPPLY OF ALTERNATING-CURRENT ELECTRIC POWER TO ELECTRIC LOAD

(75) Inventor: Itaru Saida, Kadoma (JP)

(73) Assignee: Matsushita Electric Works, Ltd., Kadoma (JP)

( * ) Notice: Subject to any disclaimer, the term of this patent is extended or adjusted under 35 U.S.C. 154(b) by 0 days.

(21) Appl. No.: 09/769,412

(22) Filed: Jan. 26, 2001

(30) Foreign Application Priority Data

Jan. 26, 2000 (JP) .......................... 2000-017044

(51) Int. Cl.[7] .............................. G05F 1/10; G05F 1/40
(52) U.S. Cl. ...................................... 323/239; 323/235
(58) Field of Search ................................. 323/235, 237, 323/239

(56) References Cited

U.S. PATENT DOCUMENTS

| 4,528,494 | A | * | 7/1985 | Bloomer ...................... 323/237 |
| 4,567,425 | A | * | 1/1986 | Bloomer ...................... 323/237 |
| 4,870,340 | A | * | 9/1989 | Kral ............................ 323/235 |
| 5,072,170 | A | * | 12/1991 | Crane et al. ................. 323/235 |
| 5,986,440 | A | * | 11/1999 | Deschenes et al. ......... 323/237 |
| 5,994,883 | A | * | 11/1999 | Liu .............................. 323/237 |
| 6,172,489 | B1 | * | 1/2001 | Walker ....................... 323/237 |
| 6,294,901 | B1 | * | 9/2001 | Peron .......................... 323/239 |

* cited by examiner

Primary Examiner—Bao Q. Vu
(74) Attorney, Agent, or Firm—Oblon, Spivak, McClelland, Maier & Neustadt, P.C.

(57) ABSTRACT

An alternating-current electric power controlling apparatus including a switch and a controller. The switch is configured to be turned on or off to connect or disconnect an alternating-current electric power source and an electric load. The controller is configured to control the switch to turn on or off to adjust supply of electric power from the alternating-current electric power source to the electric load. The switch is configured to be turned on or off when an electric power amplitude is substantially equal to 0.

23 Claims, 13 Drawing Sheets

*FIG. 3A*
OUTPUT FROM
CONTROL CIRCUIT
*FIG. 3B*
OUTPUT FROM
PHOTOTRIAC
*FIG. 3C*
ALTERNATING
-CURRENT
ELECTRIC POWER
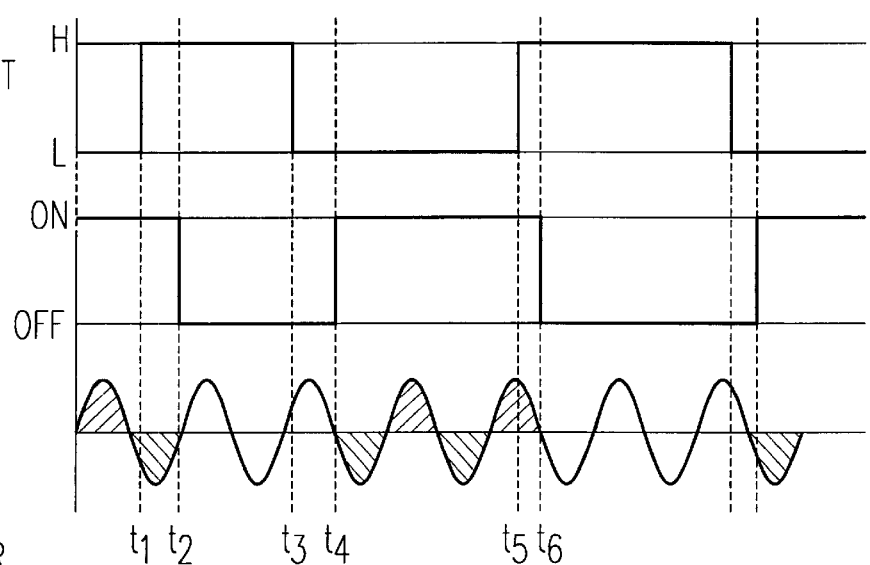
*FIG. 4A*
ALTERNATING
-CURRENT
ELECTRIC POWER
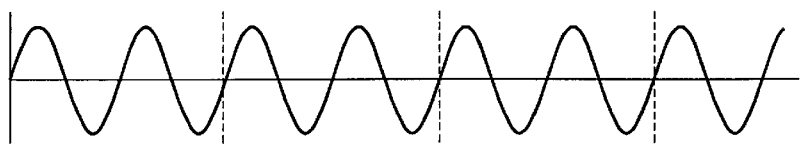
*FIG. 4B*
ALTERNATING
-CURRENT
ELECTRIC POWER
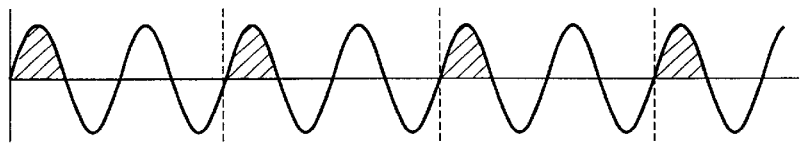
*FIG. 4C*
ALTERNATING
-CURRENT
ELECTRIC POWER
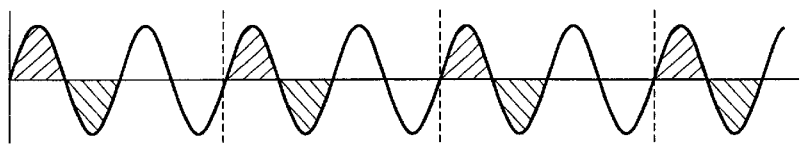
*FIG. 4D*
ALTERNATING
-CURRENT
ELECTRIC POWER
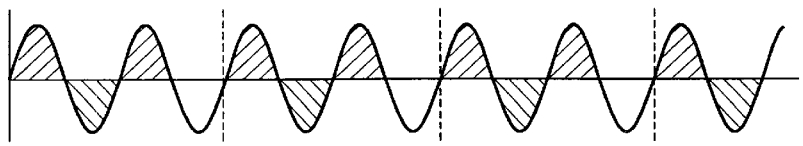
*FIG. 4E*
ALTERNATING
-CURRENT
ELECTRIC POWER
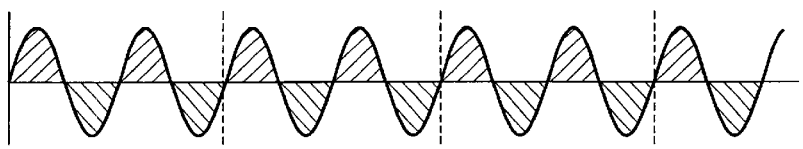

ALTERNATING
-CURRENT
ELECTRIC POWER

ALTERNATING
-CURRENT
ELECTRIC POWER

ALTERNATING
-CURRENT
ELECTRIC POWER

ALTERNATING
-CURRENT
ELECTRIC POWER

ALTERNATING
-CURRENT
ELECTRIC POWER

ALTERNATING
-CURRENT
ELECTRIC POWER

ALTERNATING
-CURRENT
ELECTRIC POWER

ALTERNATING
-CURRENT
ELECTRIC POWER

ALTERNATING
-CURRENT
ELECTRIC POWER

ALTERNATING
-CURRENT
ELECTRIC POWER

ALTERNATING
-CURRENT
ELECTRIC POWER

PATTERN I

ALTERNATING
-CURRENT
ELECTRIC POWER

PATTERN II

ALTERNATING
-CURRENT
ELECTRIC POWER

PATTERN III

ALTERNATING
-CURRENT
ELECTRIC POWER

PATTERN IV

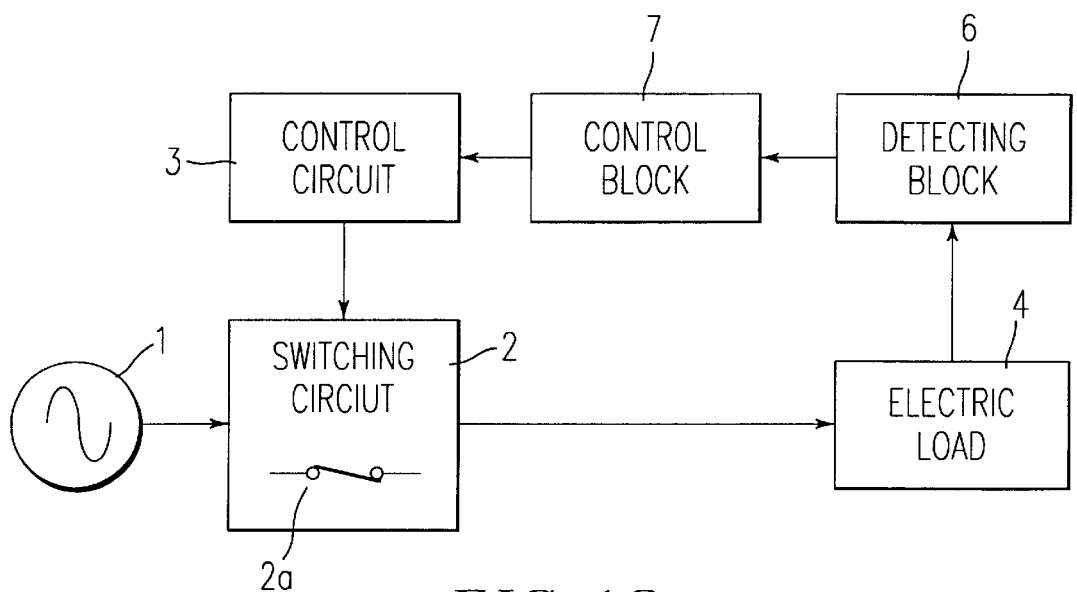
*FIG. 13*
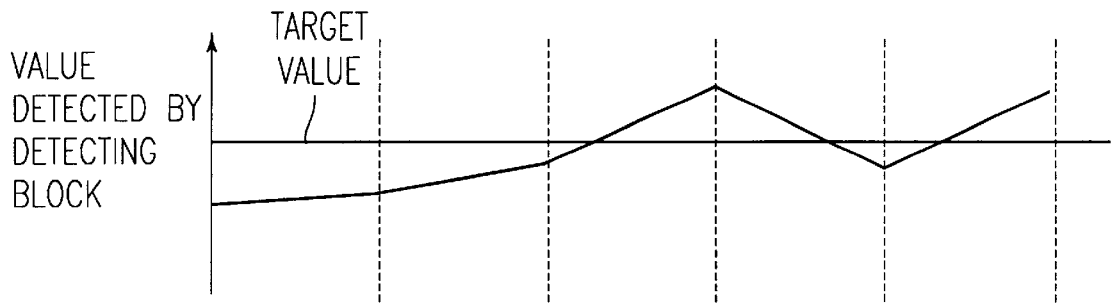
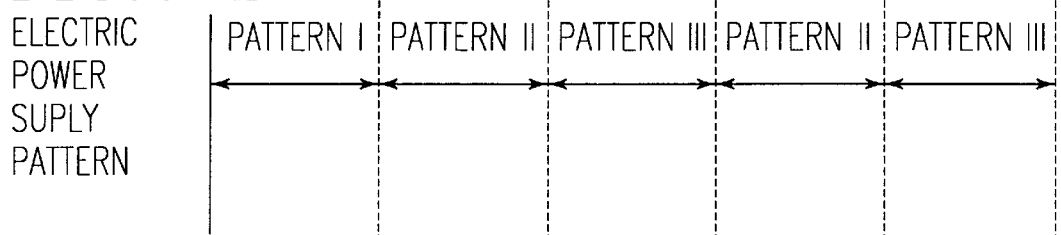
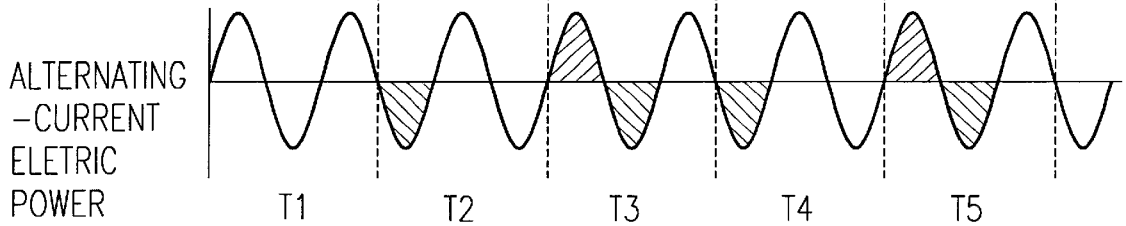

PHASE CONTROL

ON/OFF CONTROL

ALTERNATING-CURRENT ELECTRIC POWER CONTROLLING APPARATUS AND METHOD FOR CONTROLLING SUPPLY OF ALTERNATING-CURRENT ELECTRIC POWER TO ELECTRIC LOAD

CROSS-REFERENCE TO RELATED APPLICATIONS

The present application claims priority under 35 U.S.C. §119 to Japanese Patent Application No. 2000-017044, filed Jan. 26, 2000, entitled "Alternating-current Electric Power Controlling Method And Apparatus." The contents of that application are incorporated herein by reference in their entirety.

BACKGROUND OF THE INVENTION

1. Field of the Invention

The present invention relates to an alternating-current electric power controlling apparatus and a method for controlling supply of alternating-current electric power to an electric load.

2. Description of the Background

Conventionally, in order to control a supply of electric power from an alternating-current electric power source to an electric load, phase control or on/off control have been utilized. Referring to FIG. 21A, in the phase control, switching is carried out within each half cycle of alternating-current wave at a variable phase angle. The hatching portions of the electric power wave are supplied to the electric load. In the phase control, the phase angle is controlled to control the electric power to be supplied to the electric load. Referring to FIG. 21B, in the on/off control, the electric power is supplied to the electric load during a variable period of time.

In the phase control and the on/off control, however, the possibility of occurrence of harmonic current and flicker increases because current is, always in the phase control and sometimes in the on/off control, abruptly shut off. Therefore, it has been difficult to satisfy the standard requirements of IEC 6100-3-2 and IEC 6100-3-3 which the International Electric Standard Organization adopted.

SUMMARY OF THE INVENTION

According to one aspect of the invention, an alternating-current electric power controlling apparatus includes a switch and a controller. The switch is configured to be turned on or off to connect or disconnect an alternating-current electric power source and an electric load. The controller is configured to control the switch to turn on or off to adjust supply of electric power from the alternating-current electric power source to the electric load. The switch is configured to be turned on or off when an electric power amplitude is substantially equal to 0.

According to another aspect of the invention, an electric appliance includes an electric load, a switch and a controller. The switch is configured to be turned on or off to connect or disconnect an alternating-current electric power source and the electric load. The controller is configured to control the switch to turn on or off to adjust supply of electric power from the alternating-current electric power source to the electric load. The switch is configured to be turned on or off when an electric power amplitude is substantially equal to 0.

According to yet another aspect of the invention, an alternating-current electric power controller includes a controlling unit which is configured to control a switch to turn on or off to adjust supply of electric power from an alternating-current electric power source to an electric load. The switch is configured to be turned on or off when an electric power amplitude is substantially equal to 0.

According to a further aspect of the invention, an alternating-current electric power supplying system includes an alternating-current electric power source, a switch and a controller. The switch is configured to be turned on or off to connect or disconnect the alternating-current electric power source and the electric load. The controller is configured to control the switch to turn on or off to adjust supply of electric power from the alternating-current electric power source to the electric load. The switch is configured to be turned on or off when an electric power amplitude is substantially equal to 0.

According to yet another aspect of the invention, a method for controlling supply of alternating-current electric power to an electric load, includes controlling a switch to turn on or off to adjust the supply of electric power from an alternating-current electric power source to the electric load such that the switch is turned on or off when an electric power amplitude is substantially equal to 0.

According to yet another aspect of the invention, an alternating-current electric power controlling apparatus includes a switch and a controller. The switch unit is configured to be turned on or off to connect or disconnect an alternating-current electric power source and the electric load and is configured to detect that an electric power amplitude is substantially equal to 0. The controller is configured to control the switch unit to turn on or off to adjust supply of the electric power from the alternating-current electric power source to the electric load. The switch unit is configured to be turned on or off when the electric power amplitude is substantially equal to 0 and when the controller outputs control signal to the switch unit to turn on or off the switch unit.

According to further aspect of the invention, an alternating-current electric power controlling apparatus includes a switch, a timing unit and a controller. The switch is configured to be turned on or off to connect or disconnect an alternating-current electric power source and an electric load. The timing unit is configured to determine that an electric power amplitude is substantially equal to 0. The controller is configured to control the switch to turn on or off to adjust supply of electric power from the alternating-current electric power source to the electric load. The switch is configured to be turned on or off when the a timing unit determines that an electric power amplitude is substantially equal to 0.

According to yet further aspect of the invention, an alternating-current electric power controlling apparatus includes a switch and a controller. The switch is configured to be turned on or off to connect or disconnect an alternating-current electric power source and an electric load. The controller is configured to control the switch to turn on or off to adjust supply of electric power from the alternating-current electric power source to the electric load. The switch is configured to be turned on or off when a phase angle θ of a wave of the electric power is in a range of approximately 0°±20°.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which:

FIGS. 3A–3C are timing charts explaining the basic operations of alternating-current electric power controlling, wherein FIG. 3A is a signal diagram showing the control signal outputted from the output terminal of the control circuit 3, wherein FIG. 3B is a diagram showing on/off operations of the phototriac, and wherein FIG. 3C is an electric power wave diagram showing the electric power supply to the electric load;

FIGS. 4A–4E are wave diagrams according to a second embodiment of the present invention;

FIG. 13 is a block diagram of an alternating-current electric power controlling apparatus according to an eighth embodiment of the present invention;

FIGS. 14A–14C are timing charts explaining the operations of the eighth embodiment of the present invention;

FIGS. 21A–21B are wave diagrams of related art, wherein FIG. 21A is a wave diagram showing a phase control and wherein FIG. 21B is a wave diagram showing on/off operations.

DESCRIPTION OF THE PREFERRED EMBODIMENTS

Figure 1:
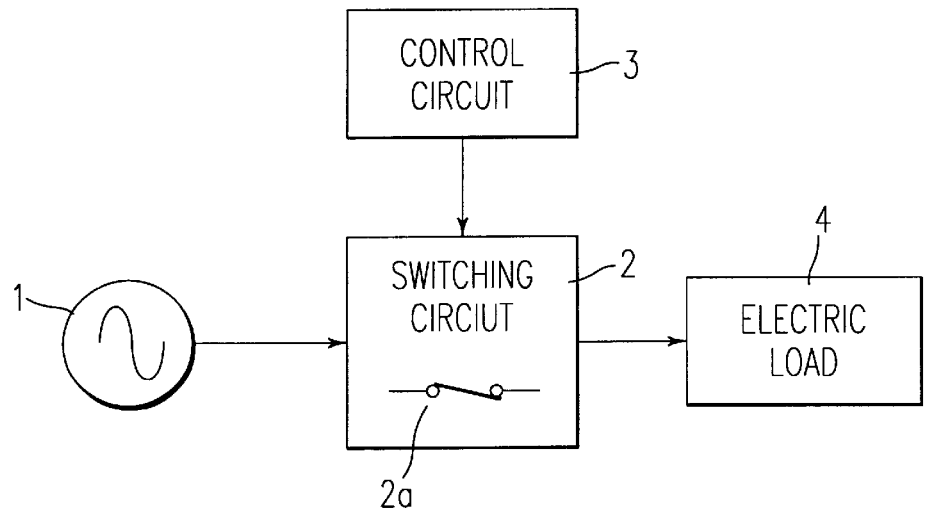
FIG. 1 is a block diagram of an alternating-current electric power controlling apparatus according to a first embodiment of the present invention.

The preferred embodiments will now be described with reference to the accompanying drawings, wherein like reference numerals designate corresponding or identical elements throughout the various drawings.

Figure 2:
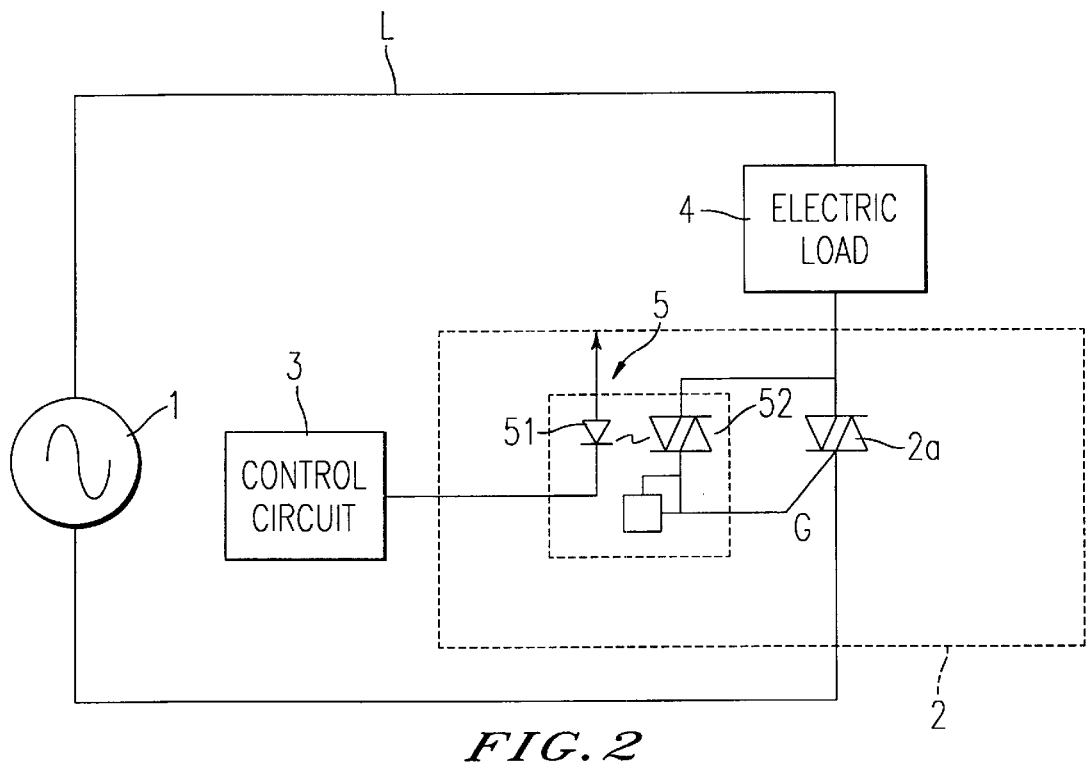
FIG. 2 is a circuit diagram according to the first embodiment of the present invention.

FIG. 1 is a block diagram of an alternating-current electric power controlling apparatus according to an embodiment of the present invention. FIG. 2 is a circuit diagram of the alternating-current electric power controlling apparatus.

Referring to FIG. 1, a commercial alternating-current electric power source 1 supplies alternating-current electric power which has a predetermined frequency. A switching circuit 2 includes a switch (2a) which is configured to connect or disconnect the alternating-current electric power source 1 to an electric load 4. A control circuit 3 is configured to control the switch (2a) of the switching circuit 2 to turn on or off to adjust the supply of electric power from the alternating-current electric power source 1 to the electric load 4. The switching circuit 2 is configured to turn on or off the switch (2a) at or near a zero-cross point of the alternating-current electric power wave, i.e., when an electric power amplitude is substantially equal to 0. The electric load 4 is, for example, a heater or the like.

Referring to FIG. 2, an electric power supply line (L) connects the switching circuit 2 to the alternating-current electric power source 1 and to the electric load 4. The switching circuit 2 includes a triac (2a) as the switch and a phototriac unit 5. The triac (2a) is connected to the line (L) and the phototriac unit 5 is configured to detect the zero-cross point. The phototriac unit 5 is a timing unit. The phototriac unit 5 includes a phototriac 52 and a light-emitting diode (LED) 51 as a light-emitting portion.

An anode of the LED 51 is connected to a constant voltage source and a cathode of the LED 51 is connected to an output terminal of the control circuit 3. The LED 51 is in an off state when the control circuit 3 outputs high level signal and in an on state to emit light when the control circuit 3 outputs low level signal. One end of the phototriac 52 is connected to the line (L) and the other end is connected to a gate (G) of the triac (2a). When the LED 51 turns on and emits light, the phototriac 52 turns on when the electric power amplitude becomes 0 or substantially 0 immediately after the LED 51 turns on. When the phototriac 52 turns on, the triac (2a) turns on. On the other hand, when the LED 51 turns off, the phototriac 52 turns off when the electric power amplitude becomes 0 or substantially 0 immediately after the LED 51 turns off. When the phototriac 52 turns off, the triac (2a) turns off. As a switching circuit 2, various circuits can be utilized if those circuits carry out switching operation at or near a zero-cross point of alternating-current electric power waves. In the present embodiment, the triac (2a) corresponds to the switch, and the control circuit 3 and the phototriac unit 5 correspond to the controller.

Figure 22:
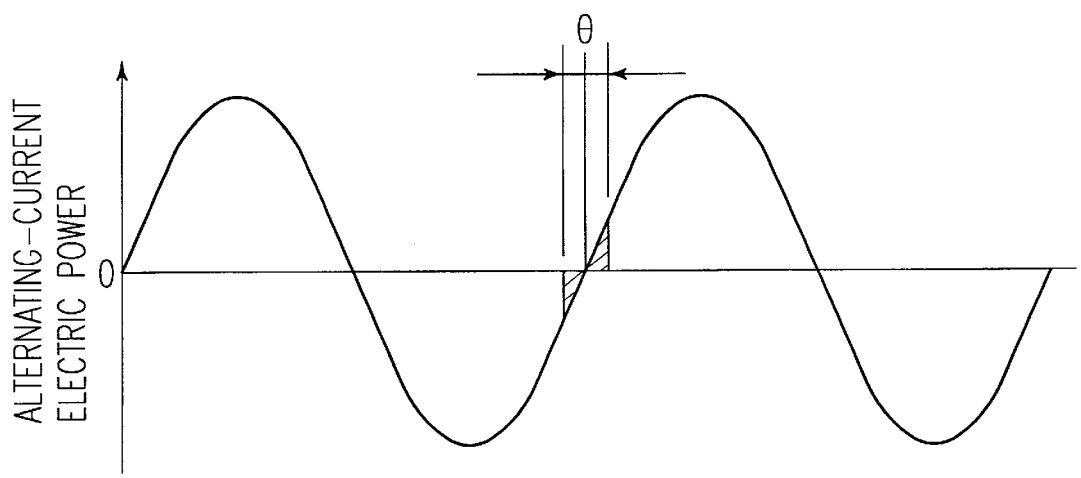
FIG. 22 is a wave diagram explaining a range of a phase angle θ of a wave of the electric power when the switch is turned on or off.

In the present embodiment, the electric power amplitude when the triac (2a) turns on and off depends on the voltage of the alternating-current electric power source 1 and the characteristics of the switching circuit 2. For example, referring to FIG. 22, the triac (2a) turns on and off when the phase angle θ0 is in a range of approximately 0°±20°.

FIGS. 3A–3C show timing charts to explain the basic operations of alternating-current electric power supply control. FIG. 3A shows the control signal outputted from the output terminal of the control circuit 3. FIG. 3B shows on/off operations of the triac 52. FIG. 3C shows alternating-current electric power waves. The hatching portions of the electric power waves are to be supplied to the electric load 4. The control circuit 3 turns on or off the switching circuit 2 every predetermined basic control span which is a unit of a control period. For example, referring to FIGS. 3A–3C, at (t1), the level of the control signal outputted from the output terminal of the control circuit 3 changes from a low level to a high level. At (t2), i.e., at the zero-cross point immediately after (t1), the phototriac 52 (see FIG. 2) turns off. Accordingly, the supply of alternating-current electric power to the electric load 4 is shut off. Then, at (t3), the level of the control signal outputted from the output terminal of the control circuit 3 changes from the high level to the low level. At (t4), i.e., at the zero-cross point immediately after (t3), the phototriac 52 turns on. Accordingly, the supply of the alternating-current electric power to the electric load 4 starts. At (t5), the level of the control signal changes from the low level to the high level. At (t6), i.e., at the zero-cross point immediately after (t5), the phototriac 52 turns off. Accordingly, the supply of the alternating-current electric power to the electric load 4 is shut off. As a result, during a period of from (t2) to (t6), i.e., during the period of 6 half-waves of the alternating-current electric power waves, the supply of the alternating-current electric power to the electric load 4 is shut off during a period of the first 3 half-waves and then the electric power is supplied to the electric load 4 during a period of the following 3 half-waves. Thus, half of the electric power from the alternating-current electric power source 1 is supplied to the electric load 4 in this period. In the present embodiment, the switching operation is always carried out at or near the zero-cross point. According to the embodiment of the present invention, since switching operation is carried out at or near the zero-cross point, harmonic current and noise emission at the time of switching operation may reduce.

FIGS. 4A–4E show wave diagrams according to a second embodiment of the present invention. The circuit structure is similar to that of the embodiment as shown in FIG. 2. In this embodiment, for example, the basic control span is two cycles (i.e. 4 half-waves) of the alternating-current electric power waves, as shown by the broken lines in FIG. 4A. The control circuit 3 outputs the control signal according to the basic control span. The electric power supply patterns include various combinations of half-waves with hatching which are supplied to the electric load 4 and half-waves without hatching which are not supplied to the electric load 4.

FIG. 4A shows a state in which the control signal outputted from the output terminal of the control circuit 3 remains at the high level. Accordingly, in this state, the alternating-current electric power from the electric power source 1 is not supplied at all to the electric load 4. FIG. 4B shows a state in which the alternating-current electric power is supplied to the electric load 4 during a period of the first half-wave of the basic control span. This electric power supply pattern may be obtained by changing the level of the control signal from high to low at a little advanced point (at most within a half cycle) from the zero-cross point and then from low to high after maintaining at the low level during a half cycle. FIG. 4C shows a state in which the alternating-current electric power is supplied to the electric load 4 during a period of the first and second half-waves of the basic control span. This electric power supply pattern may be obtained by changing the control signal from high to low at the same timing as shown in FIG. 4B and then from low to high after maintaining at the low level during one cycle. FIG. 4D shows a state in which the alternating-current electric power is supplied to the electric load 4 during a period of from the first to third half-waves of the basic control span. This electric power supply pattern may be obtained by changing the control signal from high to low at the same timing as shown in FIG. 4B and then changing the control signal from low to high during one and a half cycles. FIG. 4E shows a state in which the alternating-current electric power is supplied to the electric load 4 during an entire period of the basic control span. This electric power supply pattern may be obtained by maintaining the control signal at the low level during an entire period of the basic control span. If the voltage of the electric power supply source 1 is AC 100 (V) and the resistance of an electric load 4 is 10 ($\Omega$), electric power of 0 (W) is supplied to the electric load 4 in FIG. 4A, electric power of 250 (W) is supplied to the electric load 4 in FIG. 4B, electric power of 500 (W) is supplied to the electric load 4 in FIG. 4C, electric power of 750 (W) is supplied to the electric load 4 in FIG. 4D, and electric power of 1000 (W) is supplied to the electric load 4 in FIG. 4E.

FIGS. 5A–5F show wave diagrams according to a third embodiment of the present invention. The circuit structure of the third embodiment is similar to that of the embodiment as shown in FIG. 2. In this embodiment, for example, the basic control span is two and half cycles (i.e. 5 half-waves) of the alternating-current electric power waves, as shown by the broken lines in FIG. 5A. The control circuit 3 outputs control signal according to these basic control span. The electric power supply patterns include various combinations of half-waves with hatching which are supplied to the electric load 4 and half-waves without hatching which are not supplied to the electric load 4.

Figure 5A:
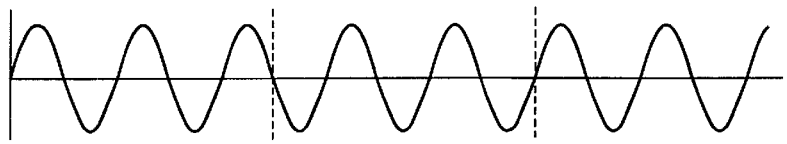
FIGS. 5A–5F are wave diagrams according to a third embodiment of the present invention.
Figure 5B:
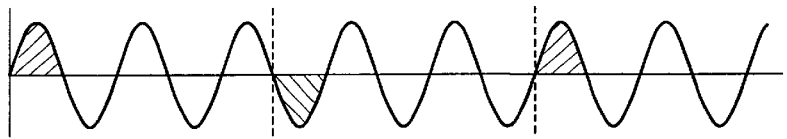
Figure 5C:
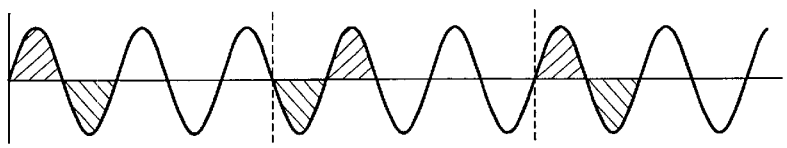
Figure 5D:
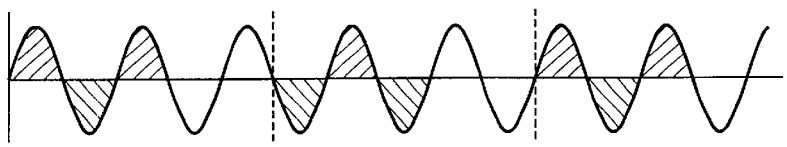
Figure 5E:
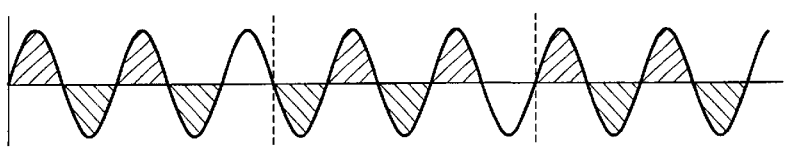
Figure 5F:
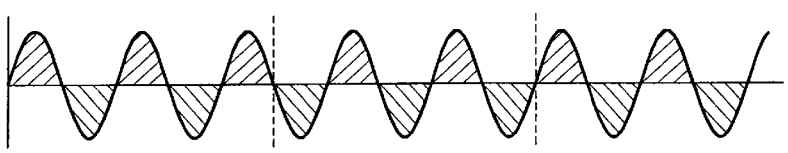

FIG. 5A shows a state in which the control signal outputted from the output terminal of the control circuit 3 remains at the high level. Accordingly, in this state, the alternating-current electric power from the electric power source 1 is not supplied at all to the electric load 4. FIG. 5B shows a state in which the alternating-current electric power is supplied to the electric load 4 during a period of the first half-wave of the basic control span. This electric power supply pattern may be obtained by changing the level of the control signal from high to low at a little advanced point (at most within a half cycle) from the zero-cross point and then from low to high after maintaining at the low level during a half cycle. FIG. 5C shows a state in which the alternating-current electric power is supplied to the electric load 4 during a period of the first and second half-waves of the basic control span. This electric power supply pattern may be obtained by changing the control signal from high to low at the same timing as shown in FIG. 5B and then from low to high after maintaining at the low level during one cycle. FIG. 5D shows a state in which the alternating-current electric power is supplied to the electric load 4 during a period of from the first to third half-waves of the basic control span. This electric power supply pattern may be obtained by changing the control signal from high to low at the same timing as shown in FIG. 5B and then changing the control signal from low to high after maintaining at the low level during one and a half cycles. FIG. 5E shows a state in which the alternating-current electric power is supplied to the electric load 4 during a period of from the first to fourth half-waves of the basic control span. This electric power supply pattern may be obtained by changing the control signal from high to low at the same timing as shown in FIG. 5B and then changing the control signal from low to high after maintaining at the low level during two cycles. FIG. 5F shows a state in which the alternating-current electric power is supplied to the electric load 4 during a entire period of the basic control span. This electric power supply pattern may be obtained by maintaining the control signal at low level during an entire period of the basic control span. If the voltage of an electric power source 1 is AC 100 (V) and the resistance of an electric load 4 is 10 Ω, electric power of 0 (W) is supplied to the electric load 4 in FIG. 5A, electric power of 200 (W) is supplied to the electric load 4 in FIG. 5B, electric power of 400 (W) is supplied to the electric load 4 in FIG. 5C, electric power of 600 (W) is supplied to the electric load 4 in FIG. 5D, electric power of 800 (W) is supplied to the electric load 4 in FIG. 5E and electric power of 1000 (W) is supplied to the electric load 4 in FIG. 5F.

In this embodiment, since the areas of plus portions and the areas of minus portions of alternating-current electric power waves which are supplied to the electric load 4 are equal, the distortions of waves and harmonic current may reduce.

FIGS. 6A–6D show wave diagrams according to a fourth embodiment of the present invention. The circuit structure of this embodiment is similar to that of the embodiment as shown in FIG. 2. In the present embodiment, for example, the basic control span is one and a half cycles (i.e. 3 half-waves) of the alternating-current electric power waves, as shown by the broken lines in FIGS. 6A–6D. The control circuit 3 outputs control signal according to these basic control span. These electric power supply patterns include various combinations of half-waves with hatching which are supplied to the electric load 4 and half-waves without hatching which are not supplied to the electric load 4.

Figure 6A:
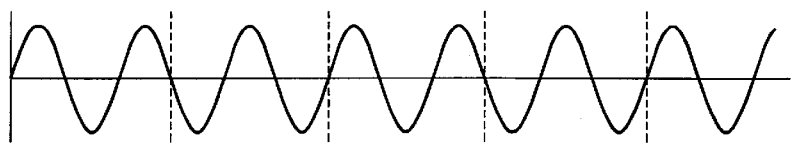
FIGS. 6A–6D are wave diagrams according to a fourth embodiment of the present invention.
Figure 6B:
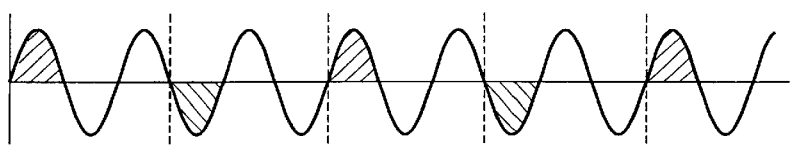
Figure 6C:
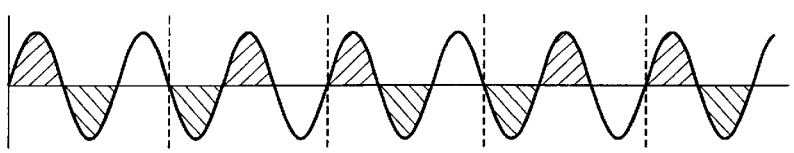
Figure 6D:
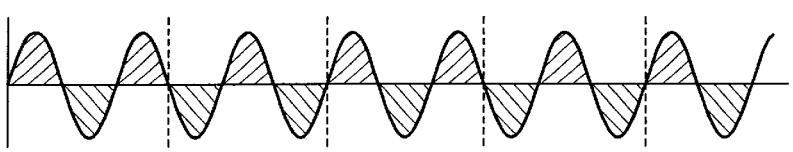

FIG. 6A shows a state in which the control signal outputted from the output terminal of the control circuit 3 remains at the high level during the entire period. Accordingly, in this situation, the alternating-current electric power from the electric power source 1 is not supplied at all to the electric load 4. FIG. 6B shows a state in which the alternating-current electric power is supplied to the electric load 4 during a period of the first half-wave of the basic control span. This electric power supply pattern may be obtained by changing the level of the control signal from high to low at a little advanced point (at most within a half cycle) from the zero-cross point and then from low to high after maintaining at the low level during a half cycle. FIG. 6C shows a state in which the alternating-current electric power is supplied to the electric load 4 during a period of the first and second half-waves of the basic control span. This electric power supply pattern may be obtained by changing the control signal from high to low at the same timing as shown in FIG. 6B and then changing the control signal from low to high after maintaining at the low level during one cycle. FIG. 6D shows a state in which the alternating-current electric power is supplied to the electric load 4 during an entire period of the basic control span. This electric power supply pattern may be obtained by maintaining the control signal at the low level during an entire period of the basic control span. If the voltage of the electric power supply source 1 is AC 100(V) and the resistance of an electric load 4 is 10 Ω, electric power of 0 (W) is supplied to the electric load 4 in FIG. 6A, electric power of 333 (W) is supplied to the electric load 4 in FIG. 6B, electric power of 666 (W) is supplied to the electric load 4 in FIG. 6C and electric power of 1000 (W) is supplied to the electric load 4 in FIG. 6D.

In this embodiment, since the areas of plus portions and the areas of minus portions of alternating-current electric power waves which are supplied to the electric load 4 are equal, the distortions of waves and harmonic current may reduce. Further, in the electric power patterns as shown in FIGS. 6A and 6D, flicker does not occur because electric power is not on and off. Among respective electric power patterns as shown in FIGS. 6A–6D, the differences among respective electric powers of the respective electric power patterns is only the electric power corresponding to one half-wave (333 (W)). Accordingly, the level of flicker may reduce.

FIGS. 7A–7D and 8A–8B show wave diagrams according to a fifth embodiment of the present invention. The circuit structure of this embodiment is similar to that of the embodiment as shown in FIG. 2. In the present embodiment, for example, the basic control span is one and a half cycles (i.e. 3 half-waves) of the alternating-current electric power waves, as shown by the broken lines in FIGS. 7A–7D. The control circuit 3 outputs control signal according to the basic control span. These electric power supply patterns include various combinations of half-waves with hatching which are supplied to the electric load 4 and half-waves without hatching which are not supplied to the electric load 4.

Figure 7A:
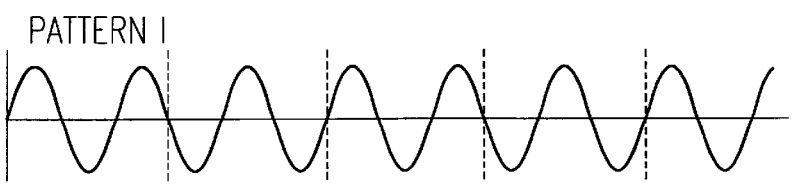
FIGS. 7A–7D are wave diagrams according to a fifth embodiment of the present invention.
Figure 7B:
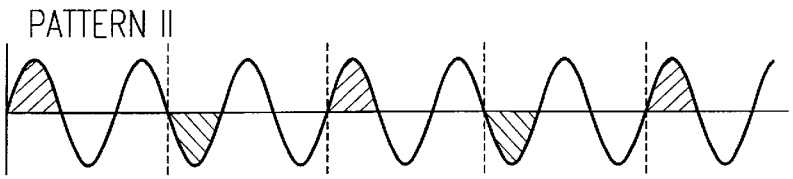
Figure 7C:
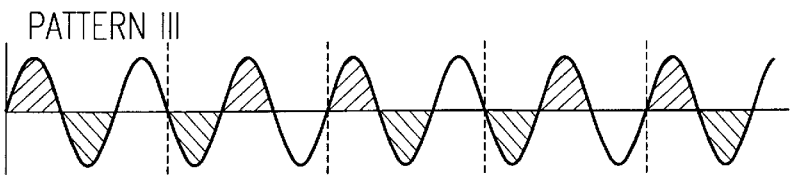
Figure 7D:
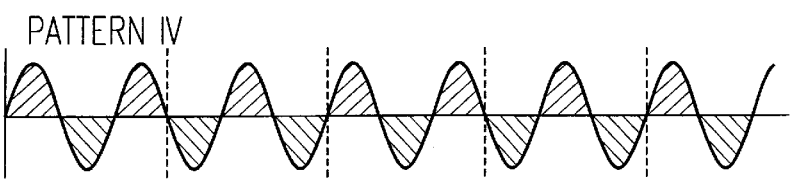

FIG. 7A shows an electric power supply pattern (I). In this electric power supply pattern, the control signal outputted from the output terminal of the control circuit 3 remains at the high level during an entire period of the basic control span. Accordingly, the electric power from the electric power supply source 1 is not supplied at all to the electric load 4. FIG. 7B shows an electric power supply pattern (II). In this electric power supply pattern, the alternating-current electric power is supplied to the electric load 4 during a period of the first half-wave of the basic control span. This electric power supply pattern may be obtained by changing the level of the control signal from high to low at a little advanced point (at most within a half cycle) from the zero-cross point and then changing the control signal from low to high after maintaining at the low level during a half cycle. FIG. 7C shows an electric power supply pattern (III). This electric power supply pattern shows that the alternating-current electric power is supplied to the electric load 4 during a period of the first and second half waves of the basic control span. This electric power supply pattern may be obtained by changing the control signal from a high level to a low level at the same timing of FIG. 7B and then changing the control signal from low to high level after maintaining at the low level during one cycle. FIG. 7D is the electric power supply pattern (IV). This electric power supply pattern shows that the alternating-current electric power is supplied to the electric load 4 during an entire period of the basic control span. This electric power supply pattern may be obtained by maintaining the control signal at the high level during the entire period. Accordingly, if the output power of the alternating-current power supply source is AC 100(V) and the resistance of the electric load 4 is 10 Ω, electric power of 0 (W) is supplied to the electric load 4 in FIG. 7A, electric power of 333 W is supplied to the electric load 4 in FIG. 7B, electric power of 666 (W) is supplied to the electric load 4 in FIG. 7C and electric power of 1000 (W) is supplied to the electric load 4 in FIG. 7D.

Figure 8A:
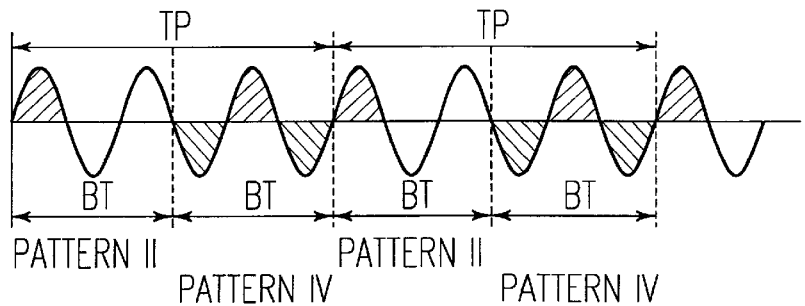
FIGS. 8A and 8B are wave diagrams according to a fifth embodiment of the present invention.
Figure 8B:
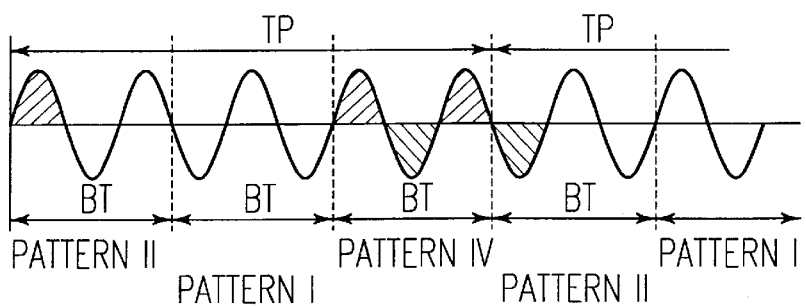

In the fifth embodiment, two electric power supply patterns as shown in FIGS. 8A and 8B is outputted by combining the electric power supply patterns (I–IV) as shown in FIGS. 7A–7D. The electric power supply patterns as shown in FIGS. 8A and 8B may be additional electric power supply patterns in addition to the electric power supply patterns (I–IV). In the electric power supply pattern as shown in FIG. 8A, the electric power supply patterns (II) and (IV) are repeated in this order. In the electric power supply pattern as shown in FIG. 8B, the three electric power supply patterns (II), (I) and (IV) are repeated in this order.

The control circuit 3 is configured to output the control signal corresponding to the basic electric power supply patterns (I)–(IV) as shown in FIGS. 7A–7D as well as the combined electric power supply patterns as shown in FIGS. 8A and 8B. For example, the control circuit 3 outputs desired electric power supply patterns (including the combined electric power supply patterns) by setting the control circuit 3.

The average electric power to be supplied is set as (333 (W)+1000 (W))/2=666 (W) in FIG. 8A and (333 (W) +1000 (W))/3=444 (W) in FIG. 8B. Accordingly, more optional electric power supply is possible because 444 (W) and 666 (W) are available in addition to the supply of 0 (W), 333 (W), 666 (W) and 1000 (W) in the fourth embodiment. In the present embodiment, the control circuit 3 has a plurality of electric power supply patterns over a period (TP) including a plurality of the basic control spans (BT). The control circuit 3 is configured to adjust the supply of electric power from the alternating-current electric power source 1 to the electric load 4 by changing the electric power supply patterns over the period (TP) including plurality of the basic control spans (BT).

Figure 9A:
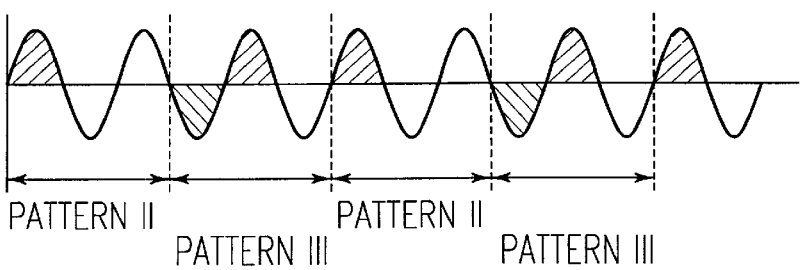
FIGS. 9A–9B are wave diagrams according to a sixth embodiment of the present invention.
Figure 9B:
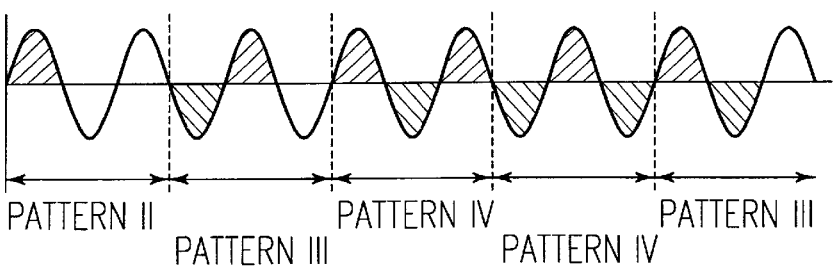

FIGS. 9A–9B show wave diagrams according to a sixth embodiment of the present invention. The circuit structure of this embodiment is similar to that of the embodiment as shown in FIG. 2. In the present embodiment, the control circuit 3 is configured to output the control signal corresponding to the basic electric power supply patterns (I)–(IV) as shown in FIGS. 7A–7D as well as the combined electric power supply patterns as shown in FIGS. 9A and 9B. In the electric power supply pattern as shown in FIG. 9A, the electric power supply patterns (II) and (III) are repeated in this order. In the electric power supply pattern as shown in FIG. 9B, the electric power supply patterns (II), (III), (IV), (IV) and (III) are repeated in this order.

The control circuit 3 is configured to output the control signal corresponding to the basic electric power supply patterns (I)–(IV) as shown in FIGS. 7A–7D as well as the combined electric power supply patterns as shown in FIGS. 9A and 9B. For example, the control circuit 3 outputs desired electric power supply patterns (including the combined electric power supply patterns) by setting the control circuit 3.

The average electric power to be supplied is set as (333 (W)+666 (W))/2=500 (W) in FIG. 9A and (333 (W)+666 (W)+1000 (W)+1000 (W)+666 (W))/5=733 (W) in FIG. 9B. Accordingly, more optional electric power supply is possible because 500 (W) and 733 (W) are available in addition to the supply of 0 (W), 333 (W), 666 (W) and 1000 (W) in the fourth embodiment. Further, in FIG. 9A, the difference between the electric power of the electric power supply pattern (II) and that of the electric power supply pattern (III) is 333 (W). In FIG. 9B, the difference between the electric power of the electric power supply pattern (II) and that of the electric power supply pattern (III) is 333 (W), and the difference between the electric power of the electric power supply pattern (III) and that of the electric power supply pattern (IV) is also 333 (W). Accordingly, the change of the electric power may be smoothly carried out and the level of flicker may reduce.

FIGS. 10A, 10B, 11A, 11B and 12 show wave diagrams according to a seventh embodiment of the present invention. The circuit structure of this embodiment is similar to that of the embodiment as shown in FIG. 2. In this seventh embodiment, the control circuit 3 is configured to output the control signal corresponding to the basic electric power supply patterns (I)–(IV) as shown in FIGS. 7A–7D bas well as the combined electric power supply patterns as shown in FIGS. 10A, 10B, 11A, 11B and 12. In the present embodiment, desired output power may be obtained by adjusting the ratio of the two kinds of the basic electric power supply patterns as shown in FIGS. 7A–7D.

Figure 10A:
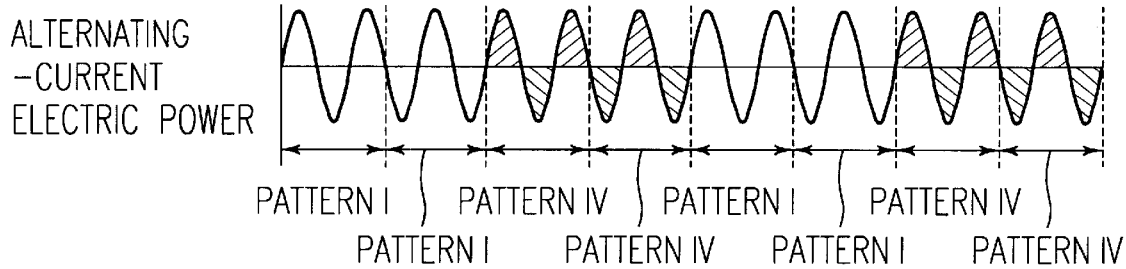
FIGS. 10A–10B are wave diagrams according to a seventh embodiment of the present invention.
Figure 10B:
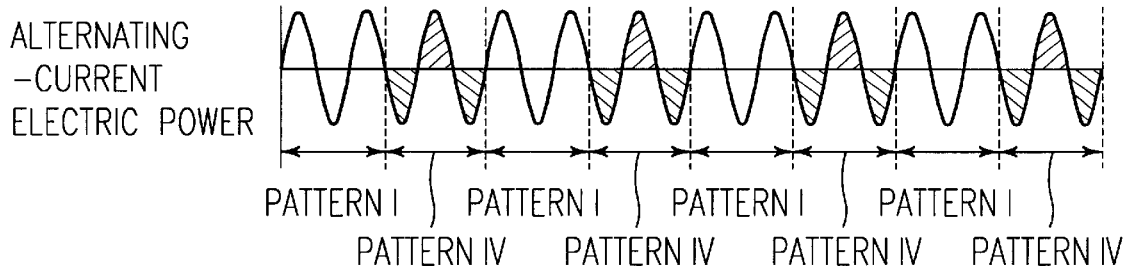

The electric power supply patterns as shown in FIGS. 10A and 10B are created by combining the basic electric power supply patterns (I) and (IV) in the 1:1 ratio. The electric power supply patterns as shown in FIG. 10A is created by repeating the basic electric power supply patterns (I), (I), (IV) and (IV) in this order. The electric power supply patterns as shown in FIG. 10B is created by repeating the basic electric power supply patterns (I) and (IV) in this order. According to these combined electric power supply patterns, 500 (W) of electric power is supplied to the electric load 4.

Figure 11A:
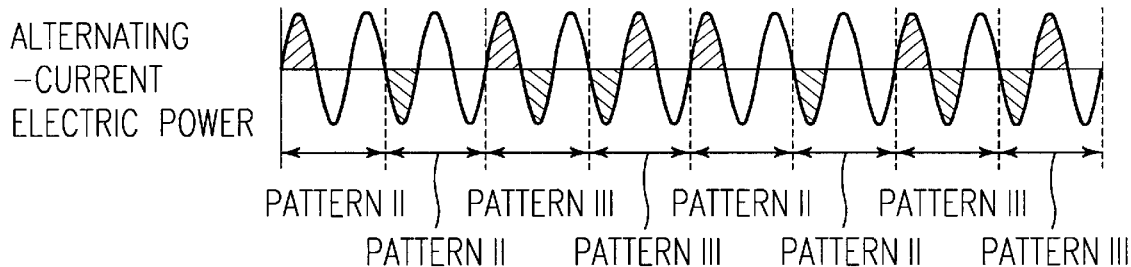
FIGS. 11A–11B are wave diagrams according to a seventh embodiment of the present invention.
Figure 11B:
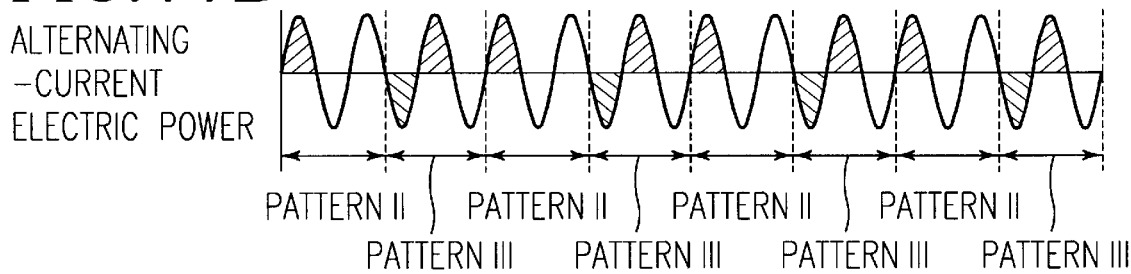

The electric power supply patterns as shown in FIGS. 11A and 11B are created by combining the basic electric power supply patterns (II) and (III) in the 1:1 ratio. The electric power supply patterns as shown in FIG. 11A is created by repeating the basic electric power supply patterns (II), (II), (III) and (III) in this order. The electric power supply patterns as shown in FIG. 11B is created by repeating the basic electric power supply patterns (II) and (III) in this order. According to these combined electric power supply patterns, electric power of 500 (W) is supplied to the electric load 4.

Figure 12:
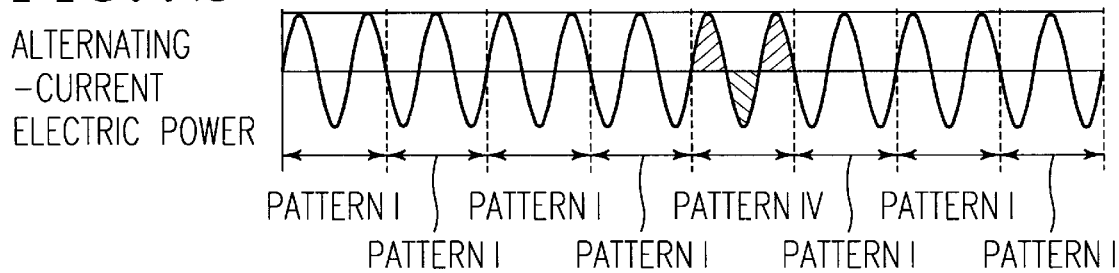
FIG. 12 is a wave diagram according to a seventh embodiment of the present invention.

The electric power supply pattern as shown in FIG. 12 is created by combining the basic electric power supply patterns (I) and (IV) in the 4:1 ratio. The electric power supply pattern as shown in FIG. 12 is created by repeating the basic electric power supply patterns (I), (I), (I) and (IV) in this order. According to the combined electric power supply pattern, electric power of 200 (W) is supplied to the electric load 4. Accordingly, desired output power may be obtained by adjusting the ratio of the two kinds of the basic electric power supply patterns as shown FIGS. 7A–7D. Three or four kinds of the basic electric power supply patterns as shown FIGS. 7A–7D may be used.

The control circuit 3 is configured to output control signal corresponding to the combined electric power supply patterns as shown in FIGS. 10A, 10B, 11A, 11B and 12 as well as the basic patters (I)–(IV) shown in FIGS. 7A–7D.

Accordingly, more optional electric power supply may be obtained because 500 (W) and 200 (W) are available in addition to the supply of 0 (W), 333 (W), 666 (W) and 1000 (W) in the fourth embodiment. For example, the control circuit 3 can output desired electric power supply patterns (including the combined electric power supply patterns) by predetermined operations. Further, desired output power may be obtained by adjusting the ratio of the two kinds of the basic electric power supply patterns as shown in FIGS. 7A–7D.

FIGS. 13 and 14A–14C explain an alternating-current electric power controlling apparatus according to an eighth embodiment of the present invention. FIG. 13 is a block diagram and FIGS. 14A–14C are timing charts to explain the operations.

Referring to FIG. 13, the alternating-current electric power source 1, the switching circuit 2, the control circuit 3 and the electric load 4 are similar to those of the embodiment shown in FIG. 1. A detecting block 6 detects the condition or the output level of the electric load 4. The control block 7, according to the sensor signal outputted from the detecting block 6, outputs pattern command signal to the control circuit 3. The pattern command signal indicates, for example, the electric power supply patterns (I–IV) as shown in FIGS. 7A–7D. For example, the control block 7 is designed to increase the electric power supply to the electric load 4 step by step, for example, from the electric power supply pattern (I) to the electric power supply pattern (II), from the electric power supply pattern (II) to the electric power supply pattern (III), or from the electric power supply pattern (III) to the electric power supply pattern (IV). Further, the control block 7 is also designed to decrease the electric power supply to the electric load 4 step by step, for example, from the electric power supply pattern (IV) to the electric power supply pattern (III), from the electric power supply pattern (III) to the electric power supply pattern (II), or from the electric power supply pattern (II) to the electric power supply pattern (I). For example, when the electric load 4 is a heater, the detecting block 6 is a temperature sensor.

Next, referring to FIGS. 14A–14C, the electric power control operations will be explained. First, the control block 7 chooses, for example, the electric power supply pattern (I). The control circuit 3 receives the pattern command signal of electric power supply pattern (I) from the control block 7. Accordingly, the electric power is not supplied to the electric load 4 during the first basic control span (T1) in FIG. 14C. Then, the detecting block 6 detects the condition of the electric load 4. If, for example, the detected temperature is lower than the target temperature which is stored in the control block 7 (the bold line in FIG. 14A), the control block 7 changes the electric power supply pattern in the next basic control span to increase the power supply to the electric load 4 by one level from the present electric power supply pattern (I) to the electric power supply pattern (II) and outputs the pattern command signal of electric power supply pattern (II). As a result, the control circuit 3 outputs the control signal corresponding to the electric power supply pattern (II) to the switching circuit 2. The alternating-current electric power is supplied to the electric load 4 during a period of the first half-wave during the basic control span (T2) in FIG. 14C. If the detected temperature is still lower than the target temperature, the control block 7 changes the electric power supply pattern in the next basic control span to increase the power supply by one level from the present electric power supply pattern (II) to the electric power supply pattern (III). Accordingly, the alternating-current electric power is supplied to the electric load 4 during a period of the first and second half-wave during the basic control span (T3) in FIG. 14C. At the end of the basic control span (T3), when the detected temperature is higher than the target temperature, the control block 7 changes the electric power supply pattern in the next basic control span (T4) to decrease the power supply by one level from the present electric power supply pattern (III) to the electric power supply pattern (II). Thereafter, the control block 7 compares the detected temperature and the target temperature, and then either increases or decreases the electric power supply to the electric load 4 by one level so that the temperature is maintained at the target temperature.

Figure 15:
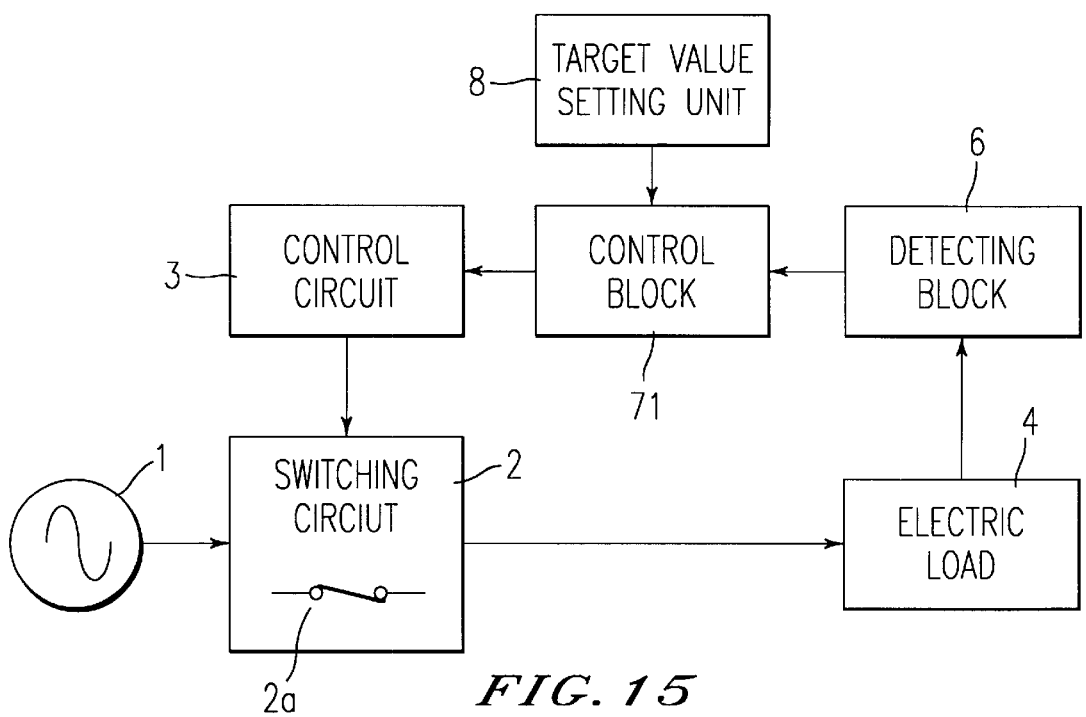
FIG. 15 is a block diagram of an alternating-current electric power controlling apparatus according to a ninth embodiment of the present invention.
Figure 16A:
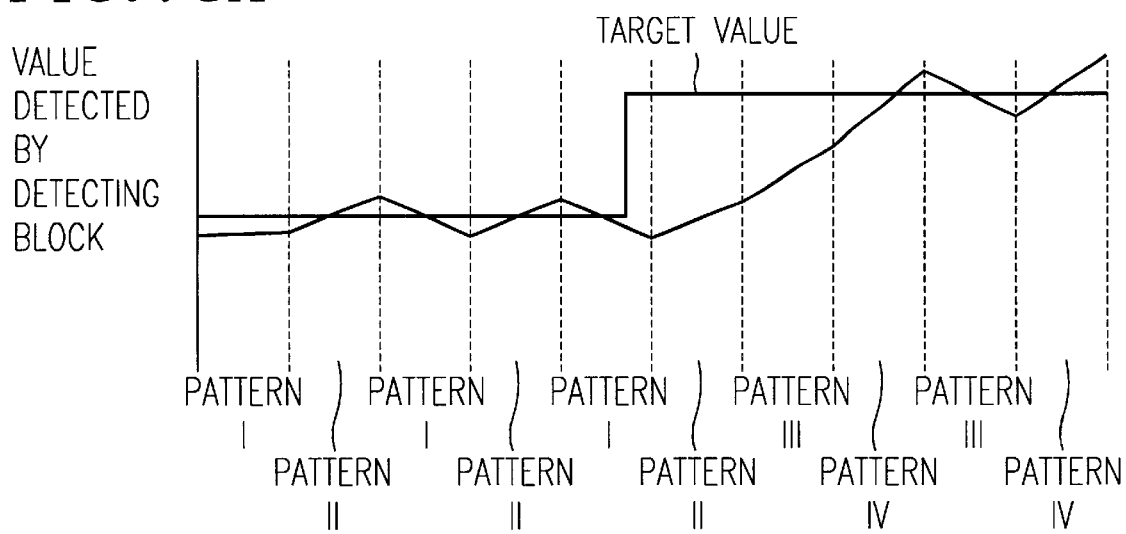
FIGS. 16A–16B are timing charts explaining the operations of the ninth embodiment of the present invention.
Figure 16B:
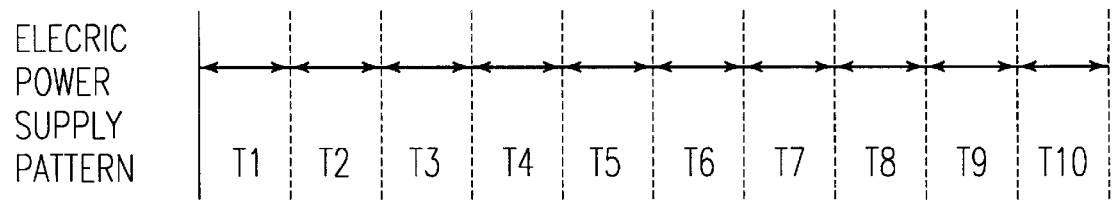

FIGS. 15 and 16A–16B explain an alternating-current electric power controlling apparatus according to a ninth embodiment of the present invention. FIG. 15 is a block diagram and FIGS. 16A–16B are timing charts to explain the operations.

Referring to FIG. 15, the alternating-current electric power source 1, the switching circuit 2, the control circuit 3, the electric load 4 and the detecting block 6 are similar to those of the embodiment shown in FIG. 13. A target value setting unit 8 includes a manually setting portion (not shown). The target value is set by operating the setting portion. The control block 71 compares the detecting signal outputted from the detecting block 6 and the target value stored in the target value setting unit 8. The control block 7, according to the sensor signal outputted from the detecting block 6, outputs the pattern command signal to the control circuit 3. The pattern command signal indicates, for example, electric power supply patterns (I–IV) shown in FIGS. 7A–7D. For example, the control block 7 is designed to increase the electric power supply to the electric load 4 step by step, for example, from the electric power supply pattern (I) to the electric power supply pattern (II), from the electric power supply pattern (II) to the electric power supply pattern (III), or from the electric power supply pattern (III) to the electric power supply pattern (IV). Further, the control block 7 is also designed to decrease the electric power supply to the electric load 4 step by step, for example, from the electric power supply pattern (IV) to the electric power supply pattern (III), from the electric power supply pattern (III) to the electric power supply pattern (II), or from the electric power supply pattern (II) to the electric power supply pattern (I). For example, when the electric load 4 is a heater, the detecting block 6 is a temperature sensor.

Next, referring to FIGS. 16A and 16B, the electric power control operations will be explained. First, the control block 71 chooses, for example, the electric power supply pattern (I). The control circuit 3 receives the pattern command signal corresponding to the electric power supply pattern (I) from the control block 71. Accordingly, the electric power is not supplied to the electric load 4 during the first basic control span (T1) in FIG. 16B. The detecting block 6 detects the condition of the electric load 4. If, for example, the detected temperature is lower than the target temperature stored in the control block 71 (the bold line in FIG. 16A), the control block 71 changes the electric power supply pattern in the next basic control span to increase the power supply by one level from the present electric power supply pattern (I) to the electric power supply pattern (II) and outputs the pattern command signal corresponding to the electric power supply pattern (II). As a result, the control circuit 3 outputs the control signal of the electric power supply pattern (II) to the switching circuit 2. The alternating-current electric power is supplied to the electric load 4 during a period of the first half-wave during the basic control span (T2) in FIG. 16B. At the end of the basic control span (T2), when the detected temperature is higher than the target temperature, the control block 71 changes the electric power supply pattern in the next basic control span (T3) to decrease the power supply by one level from the present electric power supply pattern (II) to the electric power supply pattern (I). Thereafter, the control block 71 compares the detected temperature and the target temperature, and then either increases or decreases the electric power supply to the electric load 4 by one level so that the temperature is maintained at the target temperature (during the period from T3 to T5).

During the basic control span (T5), the target temperature is increased by operating the target value setting unit 8. Since the detected temperature is lower than the target temperature at the end of the basic control span (T5), the control block 71 changes the electric power supply pattern in the next basic control span (T6) to increase the power supply by one level from the present electric power supply pattern (I) to the electric power supply pattern (II). The detected temperature is still lower than the target temperature during the basic control spans (T6 and T7), the control block 71 changes the electric power supply pattern to increase the power supply from the electric power supply pattern (II) to the electric power supply pattern (III) during the basic control span (T7) and from the electric power supply pattern (III) to the electric power supply pattern (IV) during the basic control span (T8). Thereafter, the control block 71 compares the detected temperature and the target temperature, and then either increases or decreases the electric power supply to the electric load 4 by one level so that the temperature is maintained at the target temperature (during the period from T9 to T10).

Figure 17:
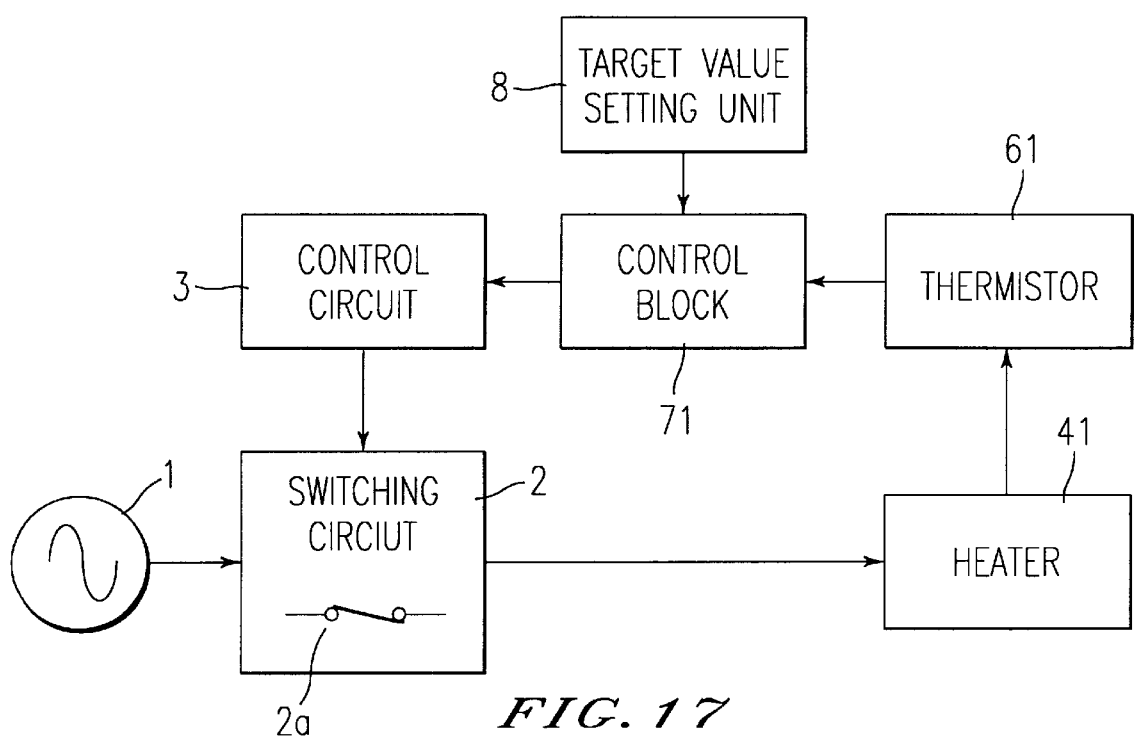
FIG. 17 is a block diagram of an alternating-current electric power controlling apparatus according to an embodiment of the present invention.
Figure 18:
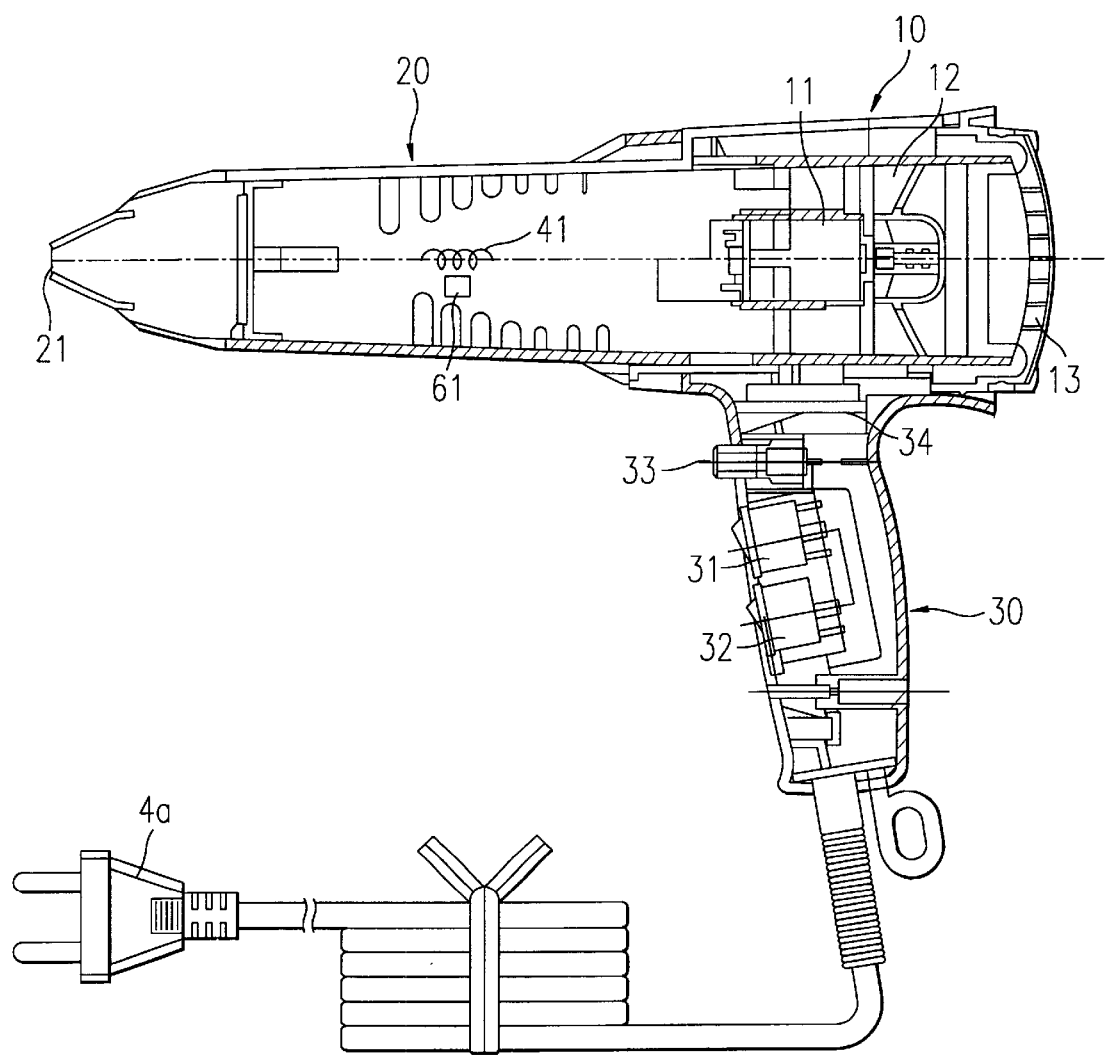
FIG. 18 is a cross-sectional view of a hair dryer according to the embodiment shown in FIG. 17.

FIGS. 17 and 18 show an electric appliance according to an embodiment of the present invention. In this embodiment, the electric appliance is, for example, a hair dryer. FIG. 17 is a block diagram and FIG. 18 is a cross-sectional view of the hair dryer.

Referring to FIG. 17, the alternating-current electric power source 1, the switching circuit 2, the control circuit 3 and the target value setting unit 8 are similar to those of the embodiment shown in FIG. 15. The target value setting unit 8 includes a manually setting portion (not shown). The target value is set by operating the setting portion. The control block 71 compares the detecting signal outputted from the thermistor 61 and the target value stored in the target value setting unit 8. The control block 71, according to the sensor signal outputted from the detecting block 6, outputs the pattern command signal to the control circuit 3. The pattern command signal indicates, for example, the electric power supply patterns (I–IV) as shown in FIGS. 7A–7D. For example, the control block 71 is designed to increase the electric power supply to the electric load 4 step by step, for example, from the electric power supply pattern (I) to the electric power supply pattern (II), from the electric power supply pattern (II) to the electric power supply pattern (III), or from the electric power supply pattern (III) to the electric power supply pattern (IV). Further, the control block 71 is also designed to decrease the electric power supply to the electric load 4 step by step, for example, from the electric power supply pattern (IV) to the electric power supply pattern (III), from the electric power supply pattern (III) to the electric power supply pattern (II), or from the electric power supply pattern (II) to the electric power supply pattern (I). In this embodiment, the electric load 4 is a heater 41 of a hair dryer and the detecting block 6 is a thermistor 61. The thermistor 61 is provided on or near the heater 41 to detect the heater temperature exactly. The thermistor 61 may be provied in the passage of the air which passed through the heater.

As shown in FIG. 18, the hair dryer has a ventilator portion 10, a heater encasing body 20, and a handle 30. The heater encasing body 20 contains the heater 41. The thermistor 61 is provided on the heater 41. The handle 30 contains various switches and control base plates. A motor 11 for ventilation is provided at a center of the ventilator portion 10. A ventilation fan 12 is connected to the axis of the motor 11 to rotate around the axis. The ventilation fan 12 intakes outside air from air intake slits 13 which are arranged at the back side of the hair dryer and sends the air to the heater encasing body 20. The heater 61 is made from, for example, NICHROME (trademark) wires. The heater 41 heats the air which is supplied from the ventilation fan 12 to the desired temperature. The heated air is sent the to the outside of the hair dryer from an air outlet 21. A main switch 31, an air speed adjusting switch 32 and an air temperature adjusting switch 33 (equivalent to the target value setting unit 8 in FIG. 17) are provided at the handle 30 for manual operations. A base plate 34 is encased inside the handle 30. The base plate 34 includes the switching circuit 2, the control circuit 3 and the control block 71 as shown in FIG. 17. The air temperature adjusting switch 33 may temporarily increase the electric current to the heater to increase the air temperature while the air temperature adjusting switch 33 is on, or may increase or decrease the target temperature step by step by, or may change the target temperature cyclically at each operation. The air temperature adjusting switch 33 may also automatically adjust the target temperature according to the air ventilation amount (the rotational speed of the ventilation fan) so that the air temperature (or the heater temperature) may be maintained at a constant temperature.

A plug 4a is arranged at the end of the lead wire drawn out of the handle 30 to connect the base plate 34 to the alternating-current electric power source 1. The electric power supply is controlled according to the methods shown in the eighth and ninth embodiments of the present invention. The alternating-current electric power is supplied from the alternating-current electric power supply source 1 to the heater to keep the heater temperature at the target temperature set by the air temperature adjusting switch 33.

The electric load may be a heater of a hair dryer or various other components operated by an alternating-current electric power. For example, the present invention may be applied to an electric power controller to control the rotational speed of a motor, a brightness controller of a lighting apparatus and the like.

Figure 19:
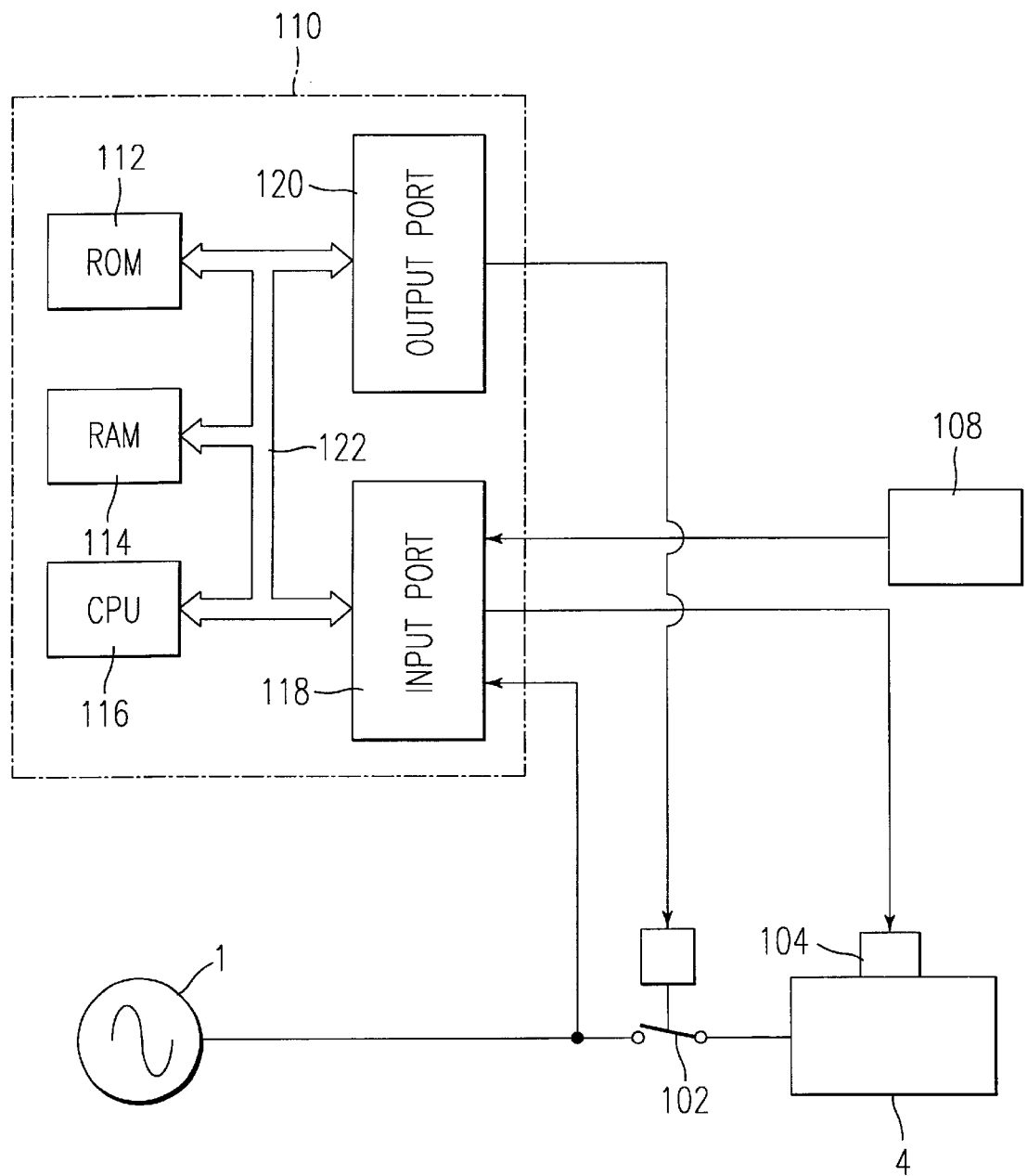
FIG. 19 is a block diagram of an alternating-current electric power controlling apparatus according to an embodiment of the present invention.
Figure 20:
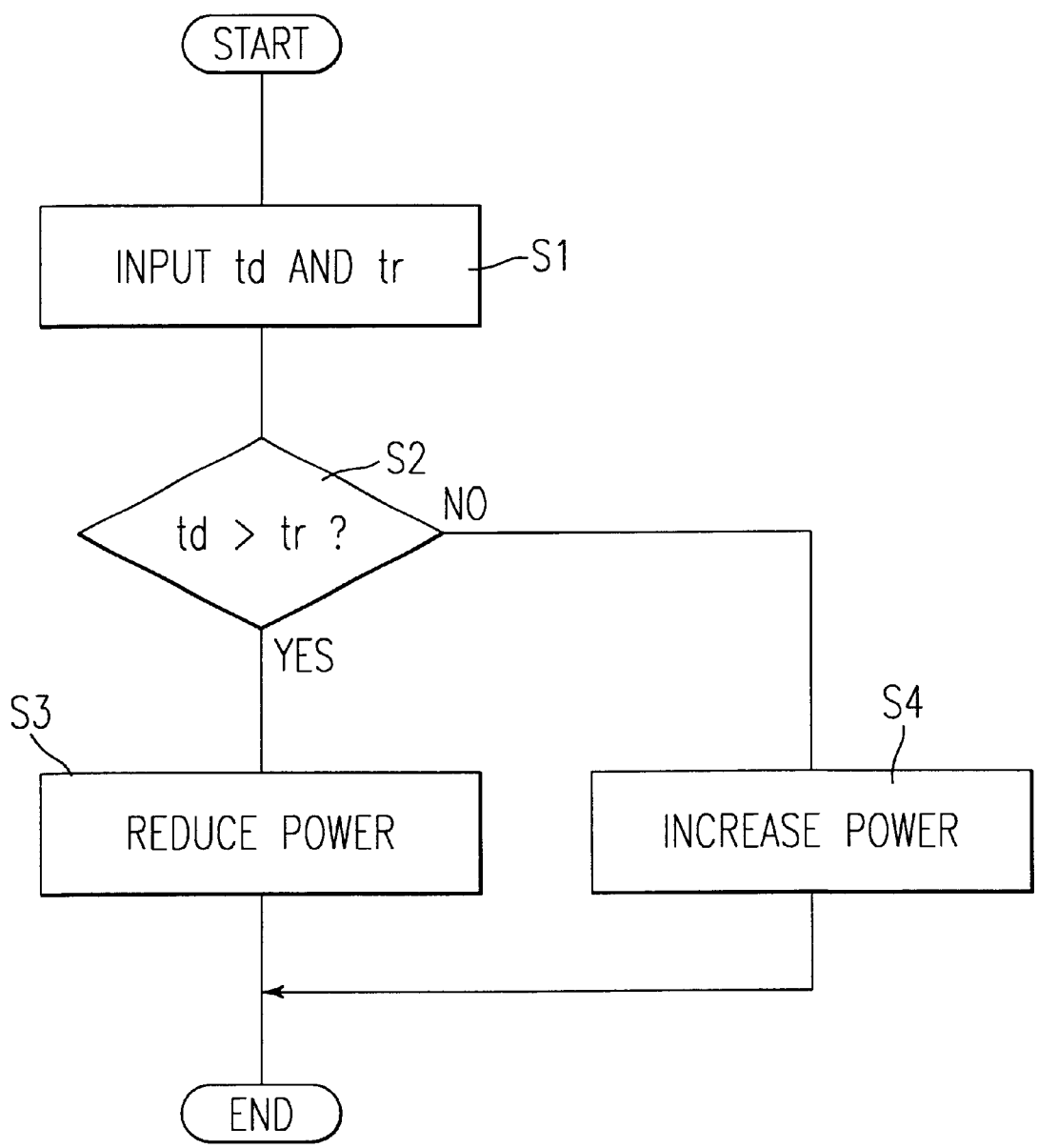
FIG. 20 is a flow chart for controlling electric power to be supplied to the electric load.
Figure 21A:
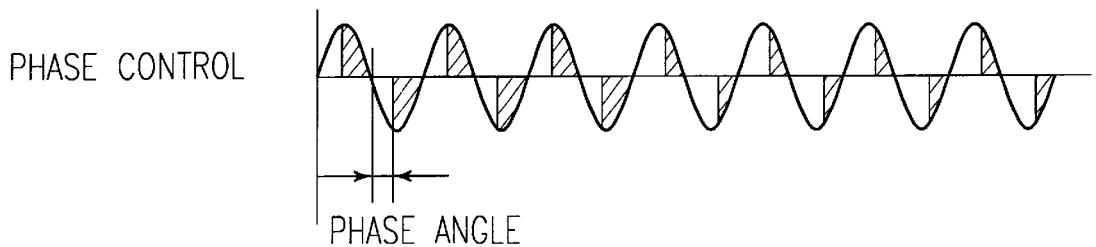
Figure 21B:
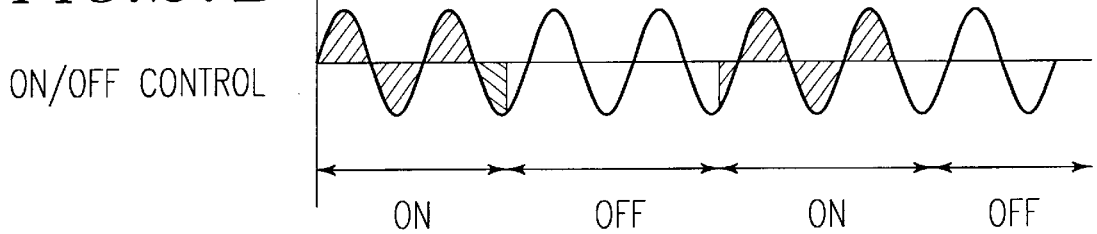

Referring to FIGS. 19 and 20, another embodiment of the present invention will be explained. Referring to FIG. 19, the electric load 4 is connected to the alternating-current electric power supply source 1 via a switch 102. A sensor is attached to the electric load 4. The sensor 104 detects the state, for example, the temperature of the electric load 4. The electronic control unit 110 is constructed as a digital computer and includes a ROM (read only memory) 112, a RAM (random access memory) 114, a CPU (micro-processor) 116, an input port 118, and an output port 120. The ROM 112, the RAM 114, the CPU 116, the input port 118, and the output port 120 are interconnected via a bidirectional bus 122. A target value setter 108 is configured to set the target value. The target value may be varied by operating the target value setter 108. The target value setter 108 is connected to the input port 118. The sensor 104 is connected to the input port 118 and sends detected signal to the input port 118. The alternating-current electric power supply source 1 is connected to the input port 118. The switch 102 is connected to the output port 120.

FIG. 20 illustrates a routine for controlling electric power to be supplied to the electric load 4. This routine is processed by sequential interruptions executed at predetermined intervals.

Referring to FIG. 20, at step (S1), a target value, for example, the target temperature (tr) and the detected value, for example, the detected temperature (td) which is detected by the sensor 104 are input to the CPU 116. At step (S2), the detected temperature (td) is compared with the target temperature (tr). When it is determined that the detected temperature (td) is higher than the target temperature (tr), the routine goes to step (S3). At step (S3), the electric power supplied to the electric load 4 reduces according to the methods described previous embodiments of the present invention. In the present embodiment, the CPU 116 determines the zero-cross point and turn on or off the switch 102 at or near the zero-cross point as described above (see FIG. 22). When it is determined that the detected temperature (td) is not higher than the target temperature (tr), the routine goes to step (S4). At step (S4), the electric power supplied to the electric load 4 increases according to the methods described in the previous embodiments of the present invention. The CPU 116 determines the zero-cross point and turn on or off the switch 102 at or near the zero-cross point. Then, this routine is repeated at predetermined intervals.

Obviously, numerous modifications and variations of the present invention are possible in light of the above teachings. It is therefore to be understood that, within the scope of the appended claims, the invention may be practiced otherwise than as specifically described herein.

What is claimed as new and is desired to be secured by Letters Patent of the United States is:

1. An alternating-current electric power controlling apparatus, comprising:
   a switch configured to be turned on and off to connect and disconnect an alternating-current electric power source and an electric load; and
   a controller configured to control the switch to turn on and off to adjust supply of electric power from the alternating-current electric power source to the electric load during every basic control span (BT) which is a unit of a control period, the basic control span (BT) being represented by the following equation:

$$BT=N^* T/2$$

where
   N: an odd number (1, 3, 5, . . . )
   T: a period of the wave of the electric power.

2. An apparatus according to claim 1, wherein (N) is equal to three.

3. An apparatus according to claim 1, wherein the controller is configured to adjust the supply of electric power from the alternating-current electric power source to the electric load by changing a number of half-waves of the electric power which are supplied to the electric load during the basic control span.

4. An apparatus according to claim 1, wherein the controller has a plurality of electric power supply patterns during the basic control span and is configured to adjust the supply of electric power from the alternating-current electric power source to the electric load by changing the electric power supply patterns.

5. An apparatus according to claim 1, further comprising:
   a detector configured to detect a physical value associated with the electric load; and
   a target value setting unit configured to store a target value, the controller being configured to control the switch to turn on or off to adjust the physical value to be the target value based on the physical value detected by the detector.

6. An apparatus according to claim 5, wherein the target value is variable.

7. An apparatus according to claim 1, wherein the switch is configured to be turned on and off when an electric power amplitude is substantially equal to 0.

8. An electric appliance, comprising:
   an electric load;
   a switch configured to be turned on and off to connect and disconnect an alternating-current electric power source and an electric load; and
   a controller configured to control the switch to turn on and off to adjust Supply of electric power from the alternating-current electric power source to the electric load during every basic control span (BT) which is a unit of a control period, the basic control span (BT) being represented by the following equation:

$$BT=N^* T/2$$

where
   N: an odd number (1, 3, 5, . . . )
   T: a period of the wave of the electric power.

9. An electric appliance according to claim 8, further comprising:
   a detector configured to detect a physical value associated with the electric load; and
   a target value setting unit configured to store a target value, the controller being configured to control the switch to turn on or off to adjust the physical value to be the target value based on the physical value detected by the detector.

10. An electric appliance according to claim 9, wherein the electric load comprises a heater and wherein the detector comprises a temperature sensor.

11. An apparatus according to claim 8, wherein the switch is configured to be turned on and off when an electric power amplitude is substantially equal to 0.

12. An alternating-current electric power controller, comprising:
    a controller configured to control the switch to turn on and off to adjust supply of electric power from the alternating-current electric power source to the electric load during every basic control span (BT) which is a unit of a control period, the basic control span (BT) being represented by the following equation:

$$BT=N^* T/2$$

where
    N: an odd number (1, 3, 5, . . . )
    T: a period of the wave of the electric power.

13. An alternating-current electric power supplying system, comprising:
    an alternating-current electric power source;
    a switch configured to be turned on or off to connect or disconnect the alternating-current electric power source and an electric load; and
    a controller configured to control the switch to turn on and off to adjust supply of electric power from the alternating-current electric power source to the electric load during every basic control span (BT) which is a unit of a control period, the basic control span (BT) being represented by the following equation:

$$BT=N^* T/2$$

where
    N: an odd number (1, 3, 5, . . . )
    T: a period of the wave of the electric power.

14. A method for controlling supply of alternating-current electric power to an electric load, comprising:
    controlling a switch to turn on and off to adjust supply of electric power from an alternating-current electric power source to the electric load during every basic control span (BT) which is a unit of a control period, the basic control span (BT) being represented by the following equation:

$$BT=N^* T/2$$

where
    N: an odd number (1, 3, 5, . . . )
    T: a period of the wave of the electric power.

15. An alternating-current electric power controlling apparatus, comprising:
    a switch unit configured to be turned on and off to connect and disconnect an alternating-current electric power source and an electric load and configured to detect that an electric power amplitude is substantially equal to 0; and a controller configured to control the switch unit to turn on and off to adjust supply of the electric power from the alternating-current electric power source to the electric load during every basic control span (BT) which is a unit of a control period, the switch unit being configured to be turned on and off when the electric power amplitude is substantially equal to 0 and when the controller outputs control signal to the switch unit to turn on and off the switch unit, the basic control span (BT) being represented by the following equation:

$$BT = N * T/2$$

where

N: an odd number (1, 3, 5, ...)

T: a period of the wave of the electric power.

16. An alternating-current electric power controlling apparatus, comprising:

a switch configured to be turned on or off to connect or disconnect an alternating-current electric power source and an electric load;

a timing unit configured to determine that an electric power amplitude is substantially equal to 0; and a controller configured to control the switch to turn on or off to adjust supply of electric power from the alternating-current electric power source to the electric load during every basic control span (BT) which is a unit of a control period, the switch being configured to be turned on or off when the a timing unit determines that an electric power amplitude is substantially equal to 0, the basic control span (BT) being represented by the following equation:

$$BT = N * T/2$$

where

N: an odd number (1, 3, 5, ...)

T: a period of the wave of the electric power.

17. An alternating-current electric power controlling apparatus, comprising:

a switch configured to be turned on and off to connect and disconnect an alternating-current electric power source and an electric load; and a controller configured to control the switch to turn on and off to adjust supply of electric power from the alternating-current electric power source to the electric load, wherein the controller has a plurality of electric power supply patterns over a period (TP) including a plurality of basic control spans and is configured to adjust the supply of electric power from the alternating-current electric power source to the electric load by changing the electric power supply patterns over the period (TP), and wherein each of the plurality of electric power supply patterns has a plurality of sub-patterns whose spans are equal to each of the basic control spans, the plurality of sub-patterns having different electric power levels and being arranged in each of the electric power supply patterns such that one sub-pattern of the plurality of sub-patterns follows another sub-pattern of the plurality of sub-patterns which has an electric power level closest to that of the one sub-pattern.

18. An apparatus according to claim 17, wherein the basic control span (BT) is represented by the following equation:

$$BT = N * T/2$$

where

N: an odd number (1, 3, 5, ...)

T: a period of the wave of the electric power.

19. An apparatus according to claim 18, wherein (N) is an even number.

20. An apparatus according to claim 18, wherein (N) is an odd number.

21. An apparatus according to claim 17, wherein the switch is configured to be turned on and off when an electric power amplitude is substantially equal to 0.

22. An apparatus according to claim 8, wherein the switch is configured to be turned on and off when a phase angle θ of a wave of the electric power is in a range of approximately 0°±20°.

23. An apparatus according to claim 1, wherein the switch is configured to be turned on and off when a phase angle θ of a wave of the electric power is in a range of approximately 0°±20°.

* * * * *

UNITED STATES PATENT AND TRADEMARK OFFICE
CERTIFICATE OF CORRECTION

PATENT NO.    : 6,404,171 B2
DATED         : June 11, 2002
INVENTOR(S)   : Itaru Saida et al.

It is certified that error appears in the above-identified patent and that said Letters Patent is hereby corrected as shown below:

Column 2,
Line 47, delete "a"

Column 4,
Line 22, insert -- the switching circuit 2 to -- between "connects" and "the"
Line 57, delete "0" between "θ" and "is"

Column 6,
Line 23, change "span" to -- spans --
Line 63, change "a" to -- an --

Column 7,
Line 21, change "span" to -- spans --

Column 9,
Line 59, change "bas" to -- as --

Column 10,
Line 30, insert -- in -- between "shown" and "FIGS"
Line 31, insert -- in -- after "shown"
Line 36, change "patters" to -- patterns --

Column 13,
Line 40, change "provied" to -- provided --
Line 55, delete "the" (third occurrence)
Line 67, delete "by" (second occurrence)

Column 14,
Line 63, change "turn" to -- turns --.

UNITED STATES PATENT AND TRADEMARK OFFICE
CERTIFICATE OF CORRECTION

PATENT NO. : 6,404,171 B2
DATED : June 11, 2002
INVENTOR(S) : Itaru Saida et al.

It is certified that error appears in the above-identified patent and that said Letters Patent is hereby corrected as shown below:

Column 17,
Line 33, delete "a"

Column 18,
Line 29, change "an odd number (1, 3, 5, ...)" to -- integer (1, 2, 3, 4, ...) --

Signed and Sealed this

Eighteenth Day of March, 2003

JAMES E. ROGAN
*Director of the United States Patent and Trademark Office*